United States Patent
Freburger, Jr.

(10) Patent No.: US 7,426,801 B2
(45) Date of Patent: Sep. 23, 2008

(54) LIVE EEL BAIT HOOKING DEVICE

(76) Inventor: Anthony Freburger, Jr., 3119 Sharon Rd., Jarrettsville, MD (US) 21084

( * ) Notice: Subject to any disclaimer, the term of this patent is extended or adjusted under 35 U.S.C. 154(b) by 0 days.

(21) Appl. No.: 11/595,344

(22) Filed: Nov. 10, 2006

(65) Prior Publication Data

US 2007/0101633 A1    May 10, 2007

Related U.S. Application Data

(60) Provisional application No. 60/736,097, filed on Nov. 10, 2005.

(51) Int. Cl.
*A01K 97/04* (2006.01)
*A01K 97/18* (2006.01)
*A01K 97/00* (2006.01)
*A22C 25/06* (2006.01)

(52) U.S. Cl. .................. 43/4; 43/55; 43/53.5

(58) Field of Classification Search ............ 43/4, 43/53.5, 54.1, 55; 269/287, 254 CS, 3, 6, 269/95; 452/196, 194
See application file for complete search history.

(56) References Cited

U.S. PATENT DOCUMENTS

| | | | | |
|---|---|---|---|---|
| 134,122 | A | * | 12/1872 | Young .............. 43/4 |
| 263,035 | A | * | 8/1882 | Fellinger .......... 269/287 |
| 342,992 | A | * | 6/1886 | Baker .............. 269/287 |
| 348,818 | A | * | 9/1886 | Baker .............. 269/287 |

(Continued)

FOREIGN PATENT DOCUMENTS

CH    679729 A   *  4/1992

(Continued)

*Primary Examiner*—Darren W Ark
(74) *Attorney, Agent, or Firm*—Ober/Kaler; Royal W. Craig

(57) ABSTRACT

A live eel hook-insertion device. A hand-operated unit is disclosed that generally comprises a T-handle/trigger driving a spring-mounted plunger through a housing, an open-ended eel nesting tube at one end of the housing and defined by a lateral notch, and a distal yoke on the plunger for immobilizing an eel within the nesting tube. The T-handle trigger is actuated to trap the eel, whereupon a hook can be easily inserted into the eel. The nesting tube is further defined by a lengthwise notch to allow extraction of fishing line if the eel backs out of the nesting tube with hook attached. In use, the device is inserted into a bait well full of eels and the nesting tube is placed flat against the bottom. One eel will enter the nesting tube, whereupon the yoke is distended to trap the eel against the floor of the nesting tube. A hook with attached fishing line is inserted through the notch of the nesting tube and the eel is thereby hooked. A stationery hook-insertion device is also disclosed, and this comprises a hopper formed with a drain hole and an external neck at the drain hole, an articulated mounting bracket for the hopper, a tubular chute connected to the neck of the hopper and protruding downward therefrom, and a constricted yoke at the distal end of the tubular chute for immobilizing an eel inside said tubular chute with a portion of the eel protruding outward through the yoke for hook insertion. The eels tend to slide through the hole in the hopper and down the chute, extending its lips out of the chute for hooking the eel. Both disclosed embodiments eliminate the need to chase, catch, handle, or untangle live eels thus making this whole process of baiting them quick, clean, and easy.

4 Claims, 3 Drawing Sheets

U.S. PATENT DOCUMENTS

| | | | | |
|---|---|---|---|---|
| 752,600 | A * | 2/1904 | Sinclair | 43/55 |
| 2,091,893 | A * | 8/1937 | Tillinghast | 43/53.5 |
| 2,189,478 | A * | 2/1940 | St George | 43/4 |
| 2,480,924 | A * | 9/1949 | Heger | 43/4 |
| 2,502,816 | A * | 4/1950 | Bennek | 43/4 |
| 2,531,551 | A * | 11/1950 | Brecht et al. | 43/4 |
| 2,547,592 | A * | 4/1951 | Morris | 43/53.5 |
| 2,671,979 | A * | 3/1954 | Jones, Jr. | 43/53.5 |
| 2,741,061 | A * | 4/1956 | Harrison | 43/53.5 |
| 2,812,609 | A * | 11/1957 | Lema | 43/42.52 |
| 3,028,190 | A * | 4/1962 | Thomas | 43/53.5 |
| 3,081,576 | A * | 3/1963 | Collins | 43/53.5 |
| 3,098,312 | A * | 7/1963 | Shannon | 43/4 |
| 3,106,035 | A * | 10/1963 | Tennyson | 43/53.5 |
| 3,164,067 | A * | 1/1965 | Hurst | 43/4 |
| 3,287,845 | A * | 11/1966 | Smith | 43/53.5 |
| 3,461,590 | A * | 8/1969 | Gindele | 43/4 |
| 3,541,722 | A * | 11/1970 | Garrison | 43/4 |
| 3,556,507 | A * | 1/1971 | Haskell et al. | 43/4 |
| 3,738,050 | A * | 6/1973 | Naill | 43/4 |
| 3,905,145 | A * | 9/1975 | Cunningham | 43/53.5 |
| 3,968,588 | A * | 7/1976 | Peterson, Sr. | 43/53.5 |
| 3,975,853 | A * | 8/1976 | Aaron | 43/4 |
| 4,118,807 | A * | 10/1978 | McCauley | 43/4 |
| 4,196,538 | A * | 4/1980 | Crone | 43/55 |
| 5,376,043 | A * | 12/1994 | Carter | 452/196 |
| 5,377,445 | A * | 1/1995 | Brannon | 43/55 |
| 5,417,005 | A * | 5/1995 | Hale | 43/4 |
| 5,465,522 | A * | 11/1995 | Varda | 43/4 |
| 5,657,572 | A * | 8/1997 | Little | 43/4 |
| 5,979,106 | A * | 11/1999 | Butler | 43/5 |
| D425,172 | S * | 5/2000 | Hall | D22/149 |
| 6,073,383 | A * | 6/2000 | Line | 43/42.24 |
| 6,389,731 | B1 * | 5/2002 | Freeman | 43/4 |
| 6,651,377 | B1 * | 11/2003 | Pleasants | 43/55 |
| 6,684,562 | B1 * | 2/2004 | Schade | 43/87 |
| 6,766,609 | B1 * | 7/2004 | Aboczky | 43/53.5 |
| 6,772,554 | B1 * | 8/2004 | Boone | 43/54.1 |
| 7,191,536 | B1 * | 3/2007 | Bailey | 43/4 |
| 7,207,132 | B1 * | 4/2007 | Parsons | 43/4 |
| 2006/0053676 | A1* | 3/2006 | Mullen | 43/5 |

FOREIGN PATENT DOCUMENTS

| | | | |
|---|---|---|---|
| DE | 3710671 | A1 * | 10/1987 |
| DE | 19714362 | A1 * | 10/1998 |
| DE | 20013960 | U1 * | 1/2001 |
| DE | 20208868 | U1 * | 10/2002 |
| FR | 2720226 | A1 * | 12/1995 |
| GB | 2347060 | A * | 8/2000 |

* cited by examiner

LIVE EEL BAIT HOOKING DEVICE

CROSS-REFERENCE TO RELATED APPLICATIONS

The present application derives priority from U.S. Provisional Application No. 60/736,097 filed Nov. 10, 2005.

BACKGROUND OF THE INVENTION

1. Field of the Invention

The invention generally relates to fishing accessories for rigging bait and, more specifically, to a device to simplify the handing and baiting of live eels when hooking them.

2. Description of the Background

Fishing with live eels is one of the most effective-ways of catching striped bass and other game fish, and eels have become the bait of choice for many charter captains. Live eels present a number of advantages, including: (1) they are extremely hardy; (2) they can live for weeks in a live bait well; and (3) their skin is tough and holds a hook. On the downside, eels are a notoriously difficult bait to handle. Eels used for bait typically have a length of 7" to 10", and their skin is coated with slime. They wriggle around, contorting themselves into a slippery, slimy ball, and are often capable of wiggling free from any attempt to hold them for baiting a hook.

Most anglers prefer to rig eels by hooking them through the lips, though others prefer the eyes or tail. For even the most experienced angler, it is very difficult to retrieve an eel from a bait container by hand, place it on a bait hook, and deploy it to a prime fishing hole without killing or losing the eel, getting slime all over, or knotting the fishing line.

A variety of methods and devices for hooking live eels have been proposed over the years. For example, some fisherman use ice to pacify the eels in the bait bucket, making it easier to catch them with their bare hands or gloves. Others drop rags into the bait bucket. Eels are tactile creatures and will try to work their way into nooks and crannies to hide. The eels will try to hide in the rags, and can be more easily hooked while confined therein. However, rags are prone to snagging with fishing hooks.

In view of the severe difficulty in baiting them, no matter the method, some fisherman have even resorted to bypassing live eel bait altogether and instead fish with dead eels or artificial plastic eel fishing lures (disclosed in U.S. Pat. No. 6,073,383 to Ronnie Line issued Jun. 13, 2000). Neither of these alternatives is acceptable. Game fish such as stripers are highly selective and live eels are greatly preferred over dead.

There are no commercially-available devices to facilitate the hooking of live eels, and only one known patent effort. This involves a technique of slipping a noose over the eel's head and then pulling the noose tightly in an attempt to restrain the eel. U.S. Pat. No. 5,979,106 to Butler issued Nov. 9, 1999 shows a live eel fish baiting device having a yoke member in which an extensible loop is drawn tightly over the head end of an eel for immobilizing it while loading onto a fish hook, all without manually handling the slimy skin of the eel. This is similar to the known snake-catching nooses, but it is virtually impossible to get an eel submerged in water to place its own head in a noose. This usually results in the eel getting tangled around the noose. Moreover, they will shy away from the noose and, being tactile creatures, slither down to the darkest, deepest most confining nook or cranny that they can find. Even if the bait hook is successfully placed through the eel, it will likely be very difficult to release the eel from the noose.

There remains a need for a live eel hooking device that uses the tactile nature of these creatures to simplify hooking and substantially eliminate the hassles of fishing with live eel bait.

SUMMARY OF THE INVENTION

It is, therefore, the primary object of the present invention to provide a live eel bait hooking device that allows hooking of live eels quickly and efficiently.

Yet another object of the invention is to provide a live eel bait hooking device that uses the tactile nature of the eel to simplify hooking and make fishing with live eel bait easier.

Another object of the invention is to provide a live eel bait hooking device that eliminates the need to touch the eel when hooking it, and thus preventing the fisherman's hands from getting wet and slimy, and making it possible for those with an aversion to eels to fish with them nevertheless.

These and other objects are accomplished by two embodiments of a live eel hooking device, one of which is a stationery mounted unit that can be mounted on a small fishing boat, and the other a portable hand-operated unit.

The hand-operated unit generally comprises a T-handle/trigger driving a spring-mounted plunger through a housing, an open-ended eel nesting tube, and a distal yoke on the plunger for immobilizing an eel within the nesting tube. Eels are attracted into the nesting tube. The nesting tube is further defined by flared ends, and a lengthwise notch from end-to-end to allow removal of fishing line. In use, the device is inserted into a bait well full of eels and the nesting tube is placed flat against the bottom. The eels being tactile creatures will try to escape by wriggling into the nesting tube, through either end. After one eel enters, the T-handle trigger is manipulated, the plunger shaft is extended, the yoke traps the eel against the floor of the nesting tube with head exposed by virtue of the flared ends. This makes it very simple for a hook (attached to a fishing line) to be inserted through the exposed jaws or eye sockets of the eel, as desired, and if necessary the hook can be manipulated into and through the notch to sink the hook. The T-handle trigger is released and the hooked eel is removed for casting. In case the eel back out of the nesting tube when the T-handle trigger is released (this presumes a small hook able to pass through the tube), the fishing line can be conveniently extracted through the end-to-end notch in the nesting tube.

A stationery hook-insertion device is also disclosed, and this comprises a hopper formed with a drain hole and an external neck at the drain hole, an articulated mounting bracket for the hopper, a tubular chute connected to the neck of the hopper and protruding downward therefrom, and a constricted yoke at the distal end of the tubular chute for immobilizing an eel inside said tubular chute with a portion of the eel protruding outward through the yoke for hook insertion. In use, a net is used to transport an eel from a bait container into the hopper. The eel will slide through the hole in the hopper and down the chute, lodging against the constricted yoke with its lips extended out of the chute for hooking the eel. The chute may be removed from the hopper for convenient hooking of the eel. The chute likewise has an elongate notch running sidelong. Again, this makes it very simple for a hook (attached to a fishing line) to be inserted through the exposed jaws or eye sockets of the eel, as desired, and if necessary the hook can be manipulated into and through the notch to sink the hook. The hook may be slid up through the slot along the chute to straighten up the fishing line and remove the hooked eel.

Both of the foregoing embodiments eliminate the need to chase, catch, handle, or untangle live eels thus making this whole process of baiting them quick, clean, and easy.

BRIEF DESCRIPTION OF THE DRAWING

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

The present invention is a live eel bait hooking device to simplify the handing of live eels when hooking them. Two embodiments are illustrated herein, including a portable hand-operated version 10 and a stationery boat-mounted version 30.

Figure 1:
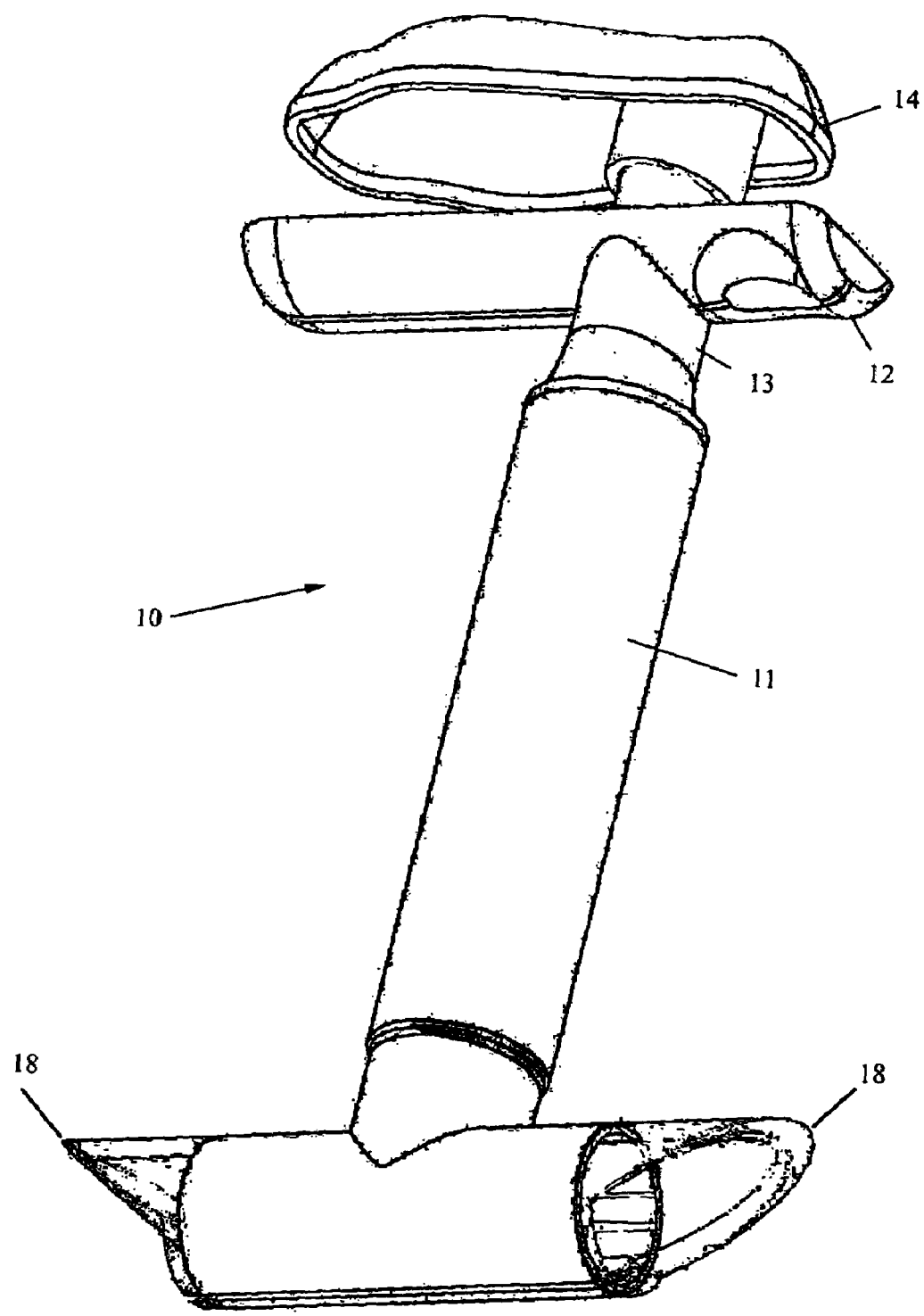
FIG. 1 is a front perspective view of a portable hand-operated version 10 of the invention.
Figure 2:
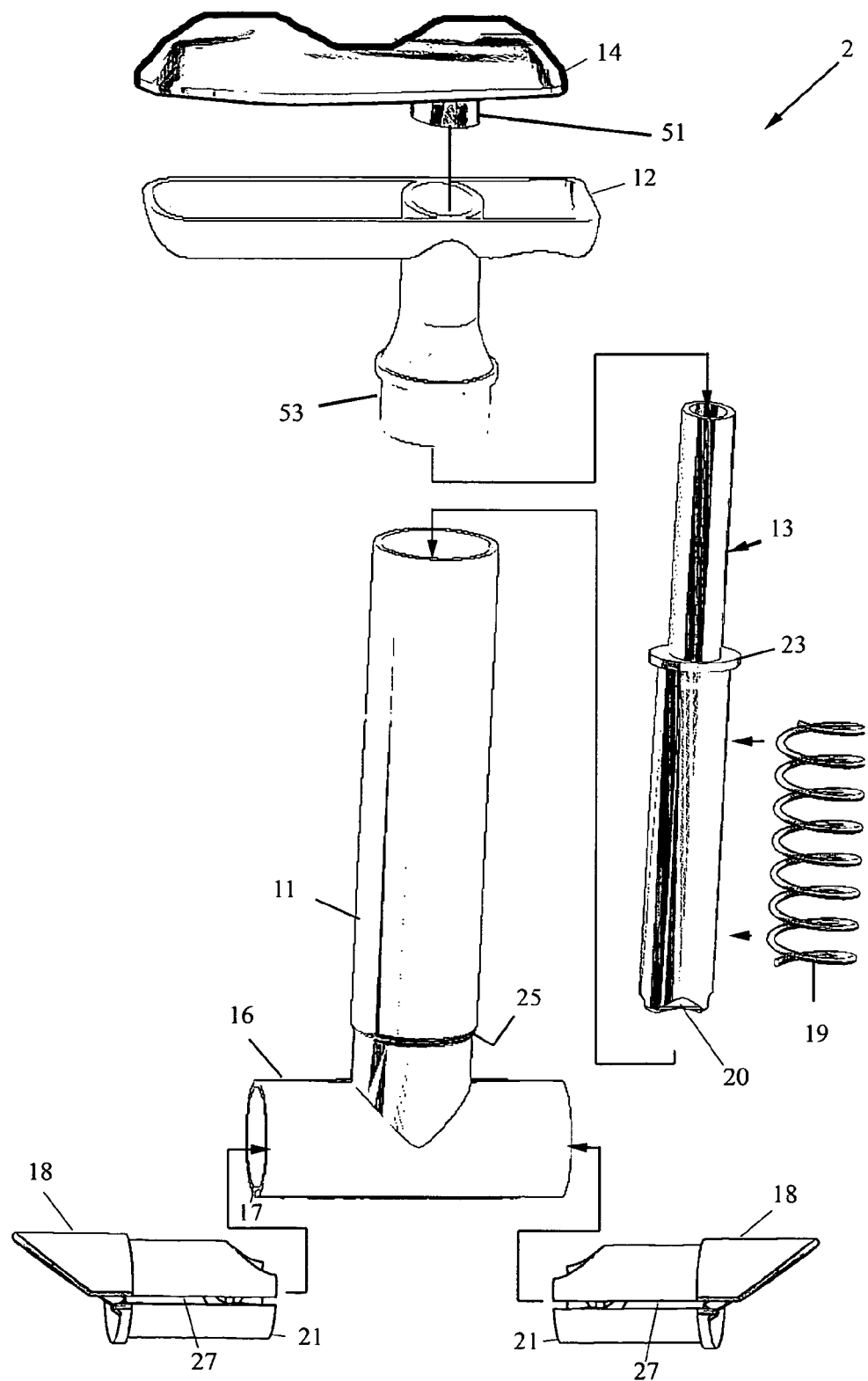
FIG. 2 is an exploded view of the embodiment 10 of FIG. 1.

FIGS. 1 and 2 are front and sectional views respectively, of the portable hand-operated eel hooking device 10 according to the present invention. The hand-operated version generally comprising a cylindrical body 11, a transverse stationery handle 12 attached to the cylindrical body 11 and having an aperture for passing a plunger shaft 13 inserted into the aperture of the stationery handle 12 and down through the cylindrical body 11, and a movable T-handle 14 mounted atop the plunger shaft 13. This T-handle trigger configuration allows a user to hold the hand-operated eel hooking device 10 in one hand and compress the movable handle 14 toward the stationery handle 12 (in the manner of a syringe), thereby urging the plunger shaft 13 down through the cylindrical body 11.

The movable T-handle 14 may be friction fit and/or glued atop the plunger shaft 13 by a downwardly protruding collar 51. Similarly, the stationery handle 12 is fixedly mounted to the cylindrical body 11 by friction fit and/or gluing of a downwardly protruding cap 53 into the body 11. Note that is it undesirable for the plunger shaft 13 to rotate inside cylindrical body 11 during use and to prevent this the shaft 13 may be keyed to the cylindrical body 11 in some manner, such as by forming the cylindrical body 11 with an irregular cross-section (e.g., oblong) and shoulder 23 likewise shaped to conform to the interior cross-section. Alternatively, a vertical rib may be formed inside the cylindrical body and keyed to a notch in shoulder 23, or any other suitable means for preventing relative rotation may be employed.

The cylindrical body 11 continues downward to a transverse nesting tube 16 fixedly attached to the cylindrical body 11. When the eel hooking device 10 is introduced into a bucket of eels such that the nesting tube 16 is at the bottom, a single eel is permitted to (and will) enter the nesting tube. By then manipulating the T-handle trigger, the plunger shaft 13 may be extended and an internal yoke (to be described) traps the eel against the floor of nesting tube 16 so that it can be easily hooked.

FIG. 2 is an exploded view of the embodiment 10 of FIG. 1. The plunger shaft 13 is spring-biased upward by a compression spring 19 mounted around the plunger shaft 13 inside body 11 and biased between a spring seat 25 at the end of body 11 and a shoulder 23 secured to the plunger shaft 13, the shoulder 23 compressing the spring 19 toward the lower spring seat 25. The compression spring 19 should non-corrosive, either stainless steel or plastic for saltwater use. The cylindrical body 11 continues downward to a transverse nesting tube 16 which comprises a length of cylindrical tube fixedly attached to (and in communication with) the cylindrical body 11. The nesting tube 16 may comprise of a piece of plastic pipe or any other suitable material. The body 11 opens into nesting tube 16 and allows the plunger shaft 13 to enter. A 1-2 mm slot 17 is defined lengthwise along the nesting tube 16 from end-to-end, slot 17 allows release of the line after hooking, in case the hook is small enough to pass through the tube 16 and the eel exits tail first at the opposing side of the nesting tube 16, thereby drawing the line through. The slot 17 is preferably located at the bottom of tube 16 but may be located along the sides if desired. Preferably, the nesting tube 16 is flared outward by optional flare inserts 18 inserted into each open end of the nesting tube 16. The flares 18 may be separate friction-fit or glued-in inserts formed as smaller tubular sections inserted into each end of the nesting tube 16 as shown in FIG. 2, or alternatively may be integrally molded or machined by cutting the nesting tube 16 with flared ends. The flares 18 serve as a backstop against the head of the eel to allow hooking, and are preferably constructed of clear or opaque plastic for better lighting and view during hooking.

Optionally, the flares 18 can be made rotatable within tube 16 and the ability to turn allows adjustment of the hooking angle as desired for greater convenience. The flares 18 can also be made extendable/retractable within tube 16 to allow adjustment with respect to the head of the eel.

Whether integrally molded or inserts, the flares 18 are also formed with a lengthwise slot 27 corresponding to slot 17. Note that so long as the slots 17, 27 are at the bottom then both flares 18 are identical and require a single mold.

The length of the nesting tube 16 should be about half the length of an average sized American eel, which has been harvested for sale as bait. An eel that has been harvested for sale as bait is approximately 7-10 inches, usually weighing less than a pound, and so the nesting tube 16 should be between 4-5 inches in length.

The plunger shaft 13 extends downward through the cylindrical body 11 to a distal yoke 20 formed to trap the head/neck of the eel against the bottom of the nesting tube 16. The distal yoke 20 engages the bottom of the nesting tube 16 and preferably forms a constricted collar therewith around the body of the eel. Since the bottom of the nesting tube 16 is semi-circular the distal yoke 20 should have at least one concave recess. In practice it has been found that a central concave recess running to four radially-spaced concave slots around the sides works best as this prevents smaller eels from getting pinched at the sides of the yoke 20 (this is seen in FIG. 2). One skilled in the art should understand that the yoke 20 may be any shape as long as it works with the inside bottom of the nesting tube 16 to hold the eel.

By simply depressing the T-handle trigger 14 down to the stationery handle 12, the plunger shaft 13 is extended along with the T-handle 14 such that concave yoke 20 enters the nesting tube 16 and engages the floor of nesting tube 16, trapping an eel that is disposed inside of nesting tube 16. While trapped (still compressing the handles 12, 14 together), the eel can be easily hooked by inserting a hook (with fishing line attached) into the protruding head of the head of the eel using the flares 18 as a backstop. The hook can be easily manipulated to pierce either the lips or eye sockets (being careful not to penetrate the brain). Alternatively, if desired, the hook may be inserted into the body of the eel through the slot 17 running lengthwise along the nesting tube 16 (and flares 18). Either way, the hooking becomes quite easy since the eel's head is protruding out through the nesting tube 16 and the body is held stationery.

In use, the hand-operated eel hooking device 10 is inserted into a bait well full of eels and the nesting tube 16 is placed flat against the bottom. The eels being tactile creatures will try to escape by wriggling into the smallest and darkest confined space that they can, namely, inside the nesting tube 16. The nesting tube 16 is sized to allow one eel to enter. Therefore, when the nesting tube 16 is placed horizontally at the bottom of the container, one eel will enter it almost immediately in an attempt to hide. After the eel enters, T-handle trigger is manipulated, the plunger shaft 13 is extended, concave yoke 20 enters the nesting tube 16 and traps the eel against the floor. After the eel is trapped the device 10 can be removed from the bait well. The head of the eel remains visible through the clear flares 18.

A standard hook (with attached fishing line) may be inserted into the slot 17 defined lengthwise along the nesting tube 16, and the hook can be manipulated inside nesting tube 16 to hook the eel. The eel's head can be lodged against the flares 18 so that the eel can be kept still while the hook is placed in its mouth or eye sockets. If fixed the flares 18 are appropriately positioned at the top of each side of the nesting tube 16 because when the device 10 is flipped over for hooking the eel, the hook can be properly installed by pushing the eel's head against a flare 18. As indicated above the flares 18 may be rotatable, retractable or extendable for added maneuverability. After placing the hook through the eel as desired, the plunger 13 can be released and the bait deployed without having to chase, catch, handle, or untangle the eel.

In case the eel back out of the nesting tube 16 when the T-handle trigger 14 is released (this presumes a small hook able to pass through the tube), the fishing line can be conveniently extracted through the end-to-end notch 17 in the nesting tube 16.

It is also noteworthy that the device 10 is self-lubricating thanks to the eel slime, and is self-cleaning since it is dipped in water each time and the water is ushered through the device 10. The device 10 may be used simply to catch and/or transfer eels from one bait container to another one, if desired, rather than hooking them.

The above-described device 10 is very compact and most useful at the shore or on small fishing boats capable of holding only small containers of live eels. For charter boats and larger vessels, a more robust stationery-mounted device is better-suited.

Figure 3:
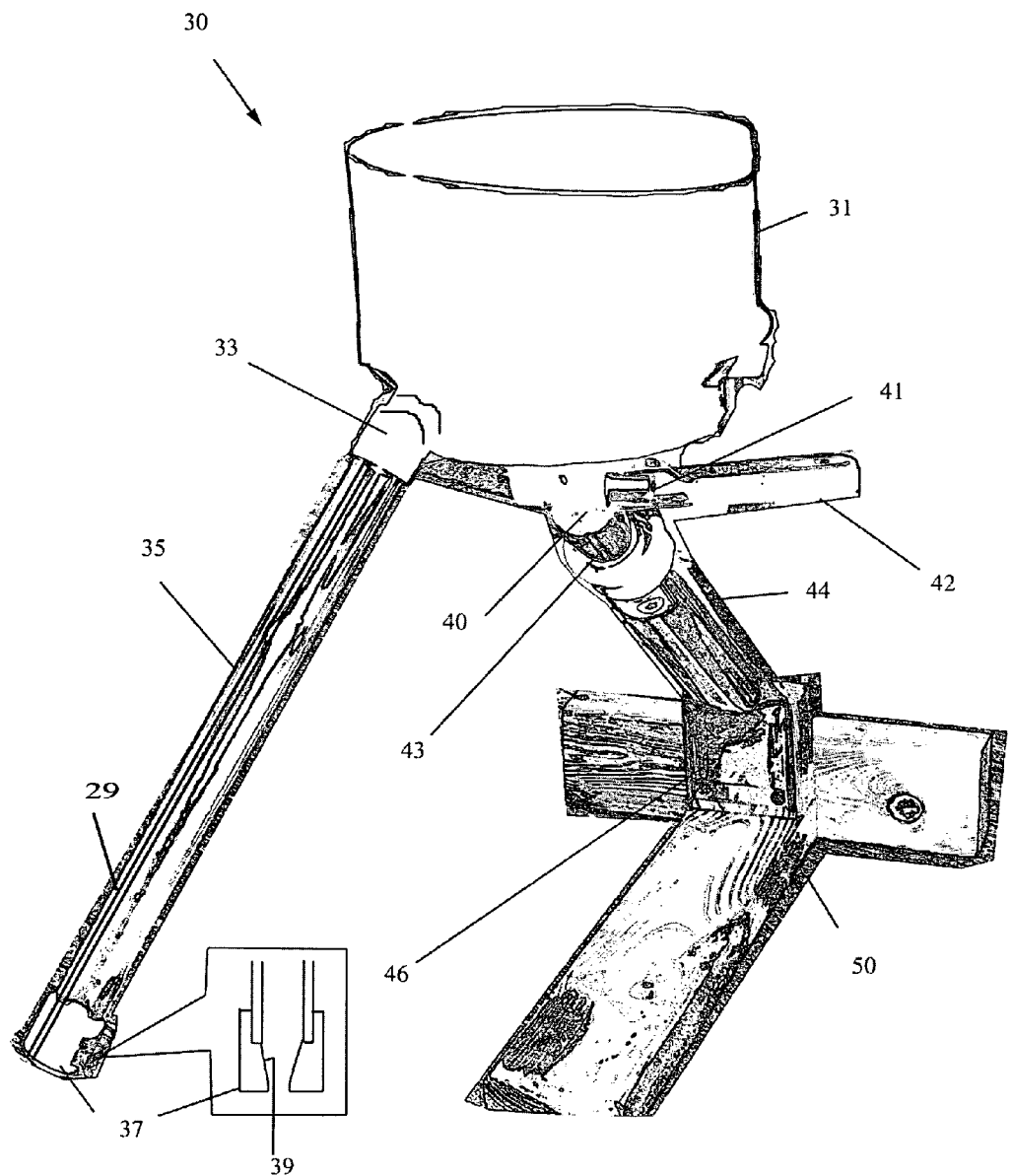
FIG. 3 is a front perspective view of a stationery embodiment 30 of the present invention.

FIG. 3 is a front perspective view of an alternate embodiment of the present invention that is better suited for stationery mounting on charter boats and larger vessels. The stationery device 30 comprising an eel hopper 31 having a bottom drain aperture with external neck 33, and a tubular chute 35 in fluid communication with the drain neck 33. The chute 35 extends downward and outward and is constricted at the end by a yoke 37. Chute 35 also has a transverse notch 29 extend lengthwise. The hopper 31 is mounted on a single-axis articulating joint 40 that may be set in position by a compression screw 41. The hopper 31 and chute 35 may be positioned by loosening the screw 41, pivoting the hopper 31 about the joint 40 via a handle 42 that protrudes rearwardly therefrom, re-tightening the screw 41. A tubular mounting stem 43 extends downward from the joint 40 and this is designed for insertion in virtually any existing rod holder. In the illustrated embodiment, a fixed mounting frame is shown including a tubular receptacle 44 that releasably receives the mounting stem 43. The tubular receptacle 44 is flattened and angled at its base to fit into a slotted mounting plate 46 that may be secured (by bolts or otherwise) to any convenient location on a boat, or to a specially constructed stand 50 as shown.

The hopper 31 is open-topped, with a flat bottom, and preferably provided with inwardly-furled top edges to prevent the eels from escaping out the top. The drain aperture and drain neck 33 are preferably sized with a diameter that is at least the diameter of a large sized American eel, which has been harvested for sale as bait (approximately 1"). The chute 35 is preferably a section of clear plastic rigid tubing of length sufficient to accommodate a good sized American eel (12-18"). The chute 35 connects to drain neck 33 via either a friction-fit, twist lock, or O-ring seal so that the chute 35 will not fall off the hopper 31. The yoke 37 at the bottom of the chute 35 comprises a plastic ring fixedly attached at the bottom of the chute 35 by friction fit insertion or the like, or the two can be modeled as one. As seen in the inset, the yoke 37 is formed with an internal aperture of a diameter that only allows the mouth of an eel to pass through. The yoke 37 (or bottom of the chute 35) may be formed with inwardly constricting walls 39 to guide the eel's mouth through aperture.

In use of the stationery device 30, a net may be used to transport one eel from a bait well into the hopper 31. It is noteworthy that use of more than one eel may cause multiple eels to wind up in the chute. Because eels are tactile bottom dwellers, it will immediately wiggle to the bottom outside edge of the hopper 31 and try to escape into the drain hole. The eel will have space to slide out through the hole and drain neck 33 and into the chute 35, and this can be confirmed by viewing the eel inside the clear chute 35. The eel will become trapped in the chute 35 and its head will lodge in the yoke 37 with lips protruding out of the yoke 37. The chute 35 can then be removed and the eel may be easily hooked with a conventional fishing hook without any consternation whatsoever. If desired, multiple chutes 35 may be used sequentially to bait and stage more than one fishing rod.

The above-described hopper 31 is preferably fabricated of plastic, and the chute 35 may be a plexiglass plastic tube. The mounting components are preferably stainless steel marine grade components. One skilled in the art will understand that any materials possessing an appropriate amount of flexibility, resiliency, and durability may be used for either the hopper 31 or the chute 35.

As is evident from the above disclosure, the device 10, 30 of the present invention possesses a simple, yet scalable, design that may be economically manufactured and sold to provide for widespread use. The device 10, 30 utilizes lightweight materials chosen to provide the appropriate degree of flexibility, resiliency, durability, and longevity required by the nature of its usage, and yet its cost is minimal to allow for inexpensive manufacturing. Both embodiments excel at hooking eels, and require the use of only one hand, leaving the other hand free to install the hook or perform other tasks.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. A live eel immobilizing device, comprising:
   a tubular housing joined sidealong to an open-ended nesting tube, an interior of said nesting tube defining a first end, a second end, and a small dark confined space for encouraging an eel to wriggle inside, said nesting tube comprising a slot running end-to-end along said nesting tube, said slot allowing communication between the small dark confined space and an exterior of said nesting tube, said nesting tube also comprising a tubular shaped flare with a first end mounted within each of said first and second ends of said nesting tube, each of said flares comprising a lengthwise slot extending from said first end to a second end thereof, and said second end of each of said flares tapers from the lengthwise slot toward an outer circumference of said flare;

a piston slidably confined inside said tubular housing and extending to a tip, the tip of said piston including an integral concave distal yoke for engaging an inner surface of said nesting tube, said piston being slidable within said housing until said tip abuts the inner surface of said nesting tube to yoke an eel there against and confine it during hooking, said piston being spring biased by a compression spring mounted on said piston.

2. The live eel immobilizing device according to claim 1, wherein said nesting tube is dimensioned to restrict entry to one eel at a time.

3. The live eel immobilizing device according to claim 1, wherein the distal yoke comprises a central concavity with four radial edge-defined concavities for engaging the inner surface of said nesting tube.

4. The live eel immobilizing device according to claim 1, further comprising a stationery handle attached to said housing and a movable handle attached to said piston for operation of said piston by squeezing said handles together.

* * * * *